US012313582B2

(12) United States Patent
Yang

(10) Patent No.: US 12,313,582 B2
(45) Date of Patent: May 27, 2025

(54) DEVICE FOR TESTING ELECTRICAL AND/OR ELECTROCHEMICAL PROPERTIES IN A 10 CUBIC CENTIMETER OR LESS TEST CELL

(71) Applicant: Yang Yang, Burke, VA (US)

(72) Inventor: Yang Yang, Burke, VA (US)

( * ) Notice: Subject to any disclaimer, the term of this patent is extended or adjusted under 35 U.S.C. 154(b) by 163 days.

(21) Appl. No.: 17/696,614

(22) Filed: Mar. 16, 2022

(65) Prior Publication Data

US 2023/0296549 A1 Sep. 21, 2023

(51) Int. Cl.
*G01N 27/30* (2006.01)
*G01N 27/02* (2006.01)
*G01N 27/27* (2006.01)

(52) U.S. Cl.
CPC ........... *G01N 27/30* (2013.01); *G01N 27/021* (2013.01); *G01N 27/028* (2013.01); *G01N 27/27* (2013.01)

(58) Field of Classification Search
CPC .... G01N 27/30; G01N 27/021; G01N 27/028; G01N 27/27
See application file for complete search history.

(56) References Cited

U.S. PATENT DOCUMENTS

2006/0145069 A1* 7/2006 Andrien, Jr. ........ H01J 49/0445 422/400
2012/0179114 A1* 7/2012 Yokota .................. A61M 5/343 604/239
2015/0080845 A1* 3/2015 Spada .................. A61F 9/0008 53/471
2021/0255141 A1* 8/2021 Mikhail ............... G01N 33/487

FOREIGN PATENT DOCUMENTS

JP H0722716 U * 4/1995

OTHER PUBLICATIONS

Huang et al., M-TUBE: a fabrication-free microfluidic device for large-volume bacterial electroporation requiring minimal assembly, doi: https://doi.org/10.1101/2022.01.14.476275, Posted Jan. 17, 2022 (Year: 2022).*

(Continued)

*Primary Examiner* — Luan V Van
*Assistant Examiner* — Shizhi Qian

(57) ABSTRACT

Described is a device for testing electrical and/or electrochemical properties for a ≤10 cubic centimeters (cc) test cell. The device is comprised of two opposing electrodes in a test cell, wherein one or both electrodes are elongated hollow cylindrical tube(s) such that the distance between the two electrodes is adjustable and measurable. Reagents including solid in powder form, liquid, and gas are optionally introduced into the test cell through the electrode(s) that are connected to a reagent container. The test cell is a transparent insulating material such as glass, quartz, plastic, or polymer; its configuration is selected from a group consisting of an open hemicylindrical channel, a sealable cylindrical tube, or a sealable box test cell. When electrical power and/or electrical measurement equipment is attached between the electrodes, electrical and electrochemical properties are measured whilst chemical reactions are observed.

18 Claims, 3 Drawing Sheets

(56) References Cited

OTHER PUBLICATIONS

Huang et al., Supplementary Information of M-TUBE: a fabrication-free microfluidic device for large-vol. bacterial electroporation requiring minimal assembly, doi: https://doi.org/10.1101/2022.01.14.476275, Posted Jan. 17, 2022 (Year: 2022) (Year: 2022).*
Yoo et al., a continuous droplet electroporation system for high throughput processing, Analyst, 2018, 143, 5785. (Year: 2018).*
Sciambi et al., Generating electric fields in PDMS microfluidic devices with salt water electrodes, Lab on a chip, 2014, 14, 2605 (Year: 2014).*
Forsberg et al., Fabrication of boron doped diamond microband electrodes for electrochemical detection in a microfluidic channel, Diamond & Related Materials, 2011, 20, 1121-1124 (Year: 2011).*
Ida, English translation of JPH0722716U, 1995 (Year: 1995).*
Tan J. N., Applied mechanics and bio-microfluidic applications for open microfluidic systems, PhD thesis of Monash University, Oct. 2014 (Year: 2014).*

* cited by examiner

DEVICE FOR TESTING ELECTRICAL AND/OR ELECTROCHEMICAL PROPERTIES IN A 10 CUBIC CENTIMETER OR LESS TEST CELL

TECHNICAL FIELD

The present invention relates to the device for electrical and/or electrochemical testing through elongated hollow cylindrical electrodes that also transport reagents into a small test cell ≤0 cubic centimeter (cc).

BACKGROUND OF THE INVENTION

The following description includes information that may be useful in understanding the present invention. It is not an admission that any such information is prior art or relevant to the presently claimed inventions, or that any publication specifically or implicitly referenced is prior art.

The size/scale of the device is a factor that can affect the electrical and electrochemical phenomena. Most tests (experimental or commercial) are conducted in a large-scale test cell, utilizing kilograms of solid material, liters of liquid, or cubic meter of vacuum space. For example, U.S. Pat. No. 2,836,792 described a dielectric testing device that uses a test cell with at least one quart capacity. The large volume minimizes the influence of changes in temperature, vibrations, and electrode surface effects. This also means that higher electrical input (>100 V AC) is needed to test electrical properties of the material of interest. In order to achieve the scale of the present invention, miniaturization of high conductor densities is often needed (i.e., micro-electro-mechanical systems or MEMS), which increases the surface-area to volume ratios of microfabricated reaction instruments. MEMS are commonly used to create tiny integrated systems of electronic and mechanical parts such as sensors, switches, and actuators. However, MEMS are often complex and expensive to manufacture (e.g., techniques include sputtering, electrodeposition, low-pressure vapor deposition, photolithography, and etching).

The electrodes used in electrical and electrochemical test instruments are any material that is a good conductor of electricity and typically of non-hollow build (e.g., wires, bolts, plates). There are two main types of electrodes: reactive (e.g., zinc, copper, or lead) and inert (e.g., platinum, gold, or graphite) relative to common reagent exposure. Their uses are ubiquitous in electroplating, battery testing, electrolysis, welding, cathodic protection, membrane electrode assembly, electroconvulsive therapy, electrocardiography, electroencephalography, and chemical analysis. In electrochemical cells, electrodes transport produced electrons from one half-cell (i.e., cathode) to another (i.e., anode), which results in the production of an electrical charge.

Currently, there are a variety of instruments that measure electrical and electrochemical properties. These instruments range from simple multimeters for troubleshooting electrical problems to more involved setups for determining dielectric strengths. By utilizing these instruments, properties such as conductivity, dielectric strengths, surface and volume resistivity, capacitance, breakdown voltage, electrochemical potential, and pH are tested. Understanding these material properties allows designers to select suitable materials for targeted applications.

The present invention relates to the device for electrical and/or electrochemical testing through elongated hollow cylindrical electrodes that also transport reagents into a small test cell ≤10 cc, while it reduces material use, lowers costs, decreases analysis time, and enables convenient experimental observations.

SUMMARY OF INVENTION

The purpose of the invention is for testing electrical and/or electrochemical properties for ≤10 cc of reagents including solid in powder form, liquid, and gas under various test parameters. The device is comprised of two opposing electrodes in a test cell, wherein one or both electrodes are tubular and hollow and that the distance between electrodes is adjustable and measurable. Reagents in container(s) are optionally introduced into the test cell through the hollow electrodes. The test cell is a transparent insulating material such as glass, quartz, plastic, or polymer. Its configuration is selected from a group consisting of an open hemicylindrical channel, a sealable cylindrical tube, a sealable box, or other enclosure. When electrical power and/or electrical measurement equipment is attached between the electrodes, electrical properties such as the dielectric strength is measured whilst chemical reactions are observed.

The objective of the present invention is to provide a device that measures a variety of electrical and electrochemical properties through the integration of components (e.g., electrode, test cell, cables, and reagent container) on a testing platform that also allows assembly and disassembly of components.

It is another objective of this invention to provide a device of the above type where the electrodes have functions that 1) self-seals or fits tightly to the test cell; 2) introduces reagent (including solid in powder form, liquid, and gaseous material) into the test cell; 3) self-aligns to each other; 4) connects to electrical power and/or measurement equipment; 5) connects to reagent; and 6) enables adjustable and measurable electrode-to-electrode distance.

It is another objective of this invention to provide a device of the above type that utilizes ≤10 cc of material, preferably ≤1 cc of materials, and more preferably ≤0.1 cc of materials in the test cell.

It is another objective of this invention to provide a device of the above type with a transparent test cell in order to observe chemical reactions visually or with optical equipment.

It is another objective of this invention to provide a device of the above type that utilizes ≤50 V AC and ≤120 V DC adjustable power source to test material properties.

It is another objective of this invention to provide a device of the above type that allows optional attachment of equipment such as a precision positioning system to accurately control electrode spacing, pH and temperature probe, multimeter, flow pump, and optical instruments to meet targeted applications.

DETAILED DESCRIPTION OF THE INVENTION

Figure 1:
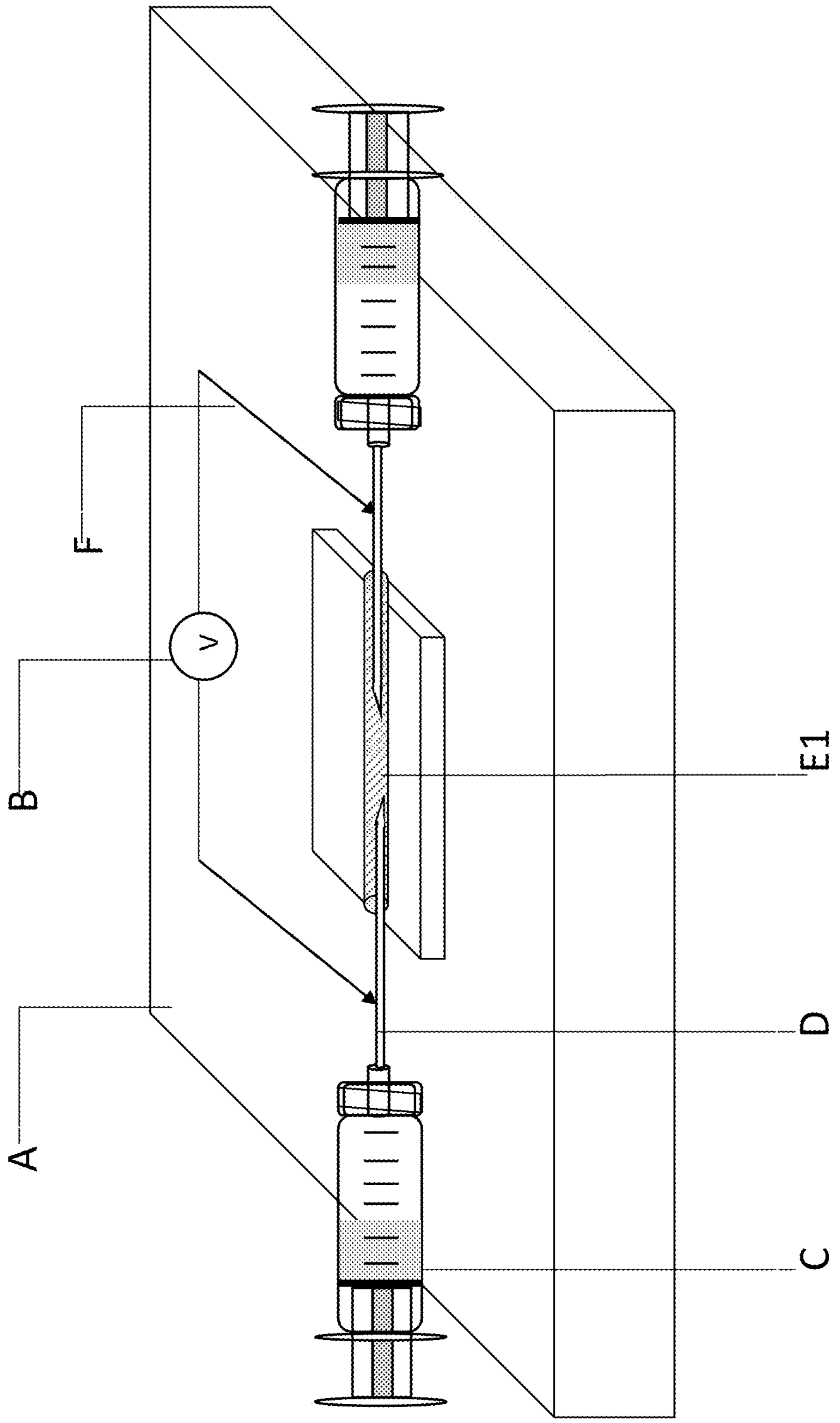
FIG. 1 illustrates an integrated device platform with an open channel test cell that positions elongated hollow tubular electrodes that are connected to a power supply and reagent containers.

FIG. 1 illustrates an embodiment of an electrical and electrochemical device that is integrated on a device platform shown as A that secures the test cell and reagent container on to it (securement method not shown in figures). This device has an open hemicylindrical channel test cell shown in E1 that positions opposing elongated hollow tubular electrodes shown as D and holds the reagent. The electrode material is selected from a group of conductive materials that are either reactive or nonreactive (e.g., zinc, silver, platinum, or graphite). The reagent is optionally introduced into the test cell channel via a container (e.g., a simple reciprocating pump consisting of a plunger that fits tightly within a barrel as shown in C) that can be manually pumped or assisted by a flow pump. When electrical power supply (either AC or DC power) or electrical measurement equipment shown as B is connected to electrodes with cables as shown in F, electrical and electrochemical properties can be measured and observed. For additional material properties tests, additional instruments can be attached based on application of the experimental design.

Figure 2:
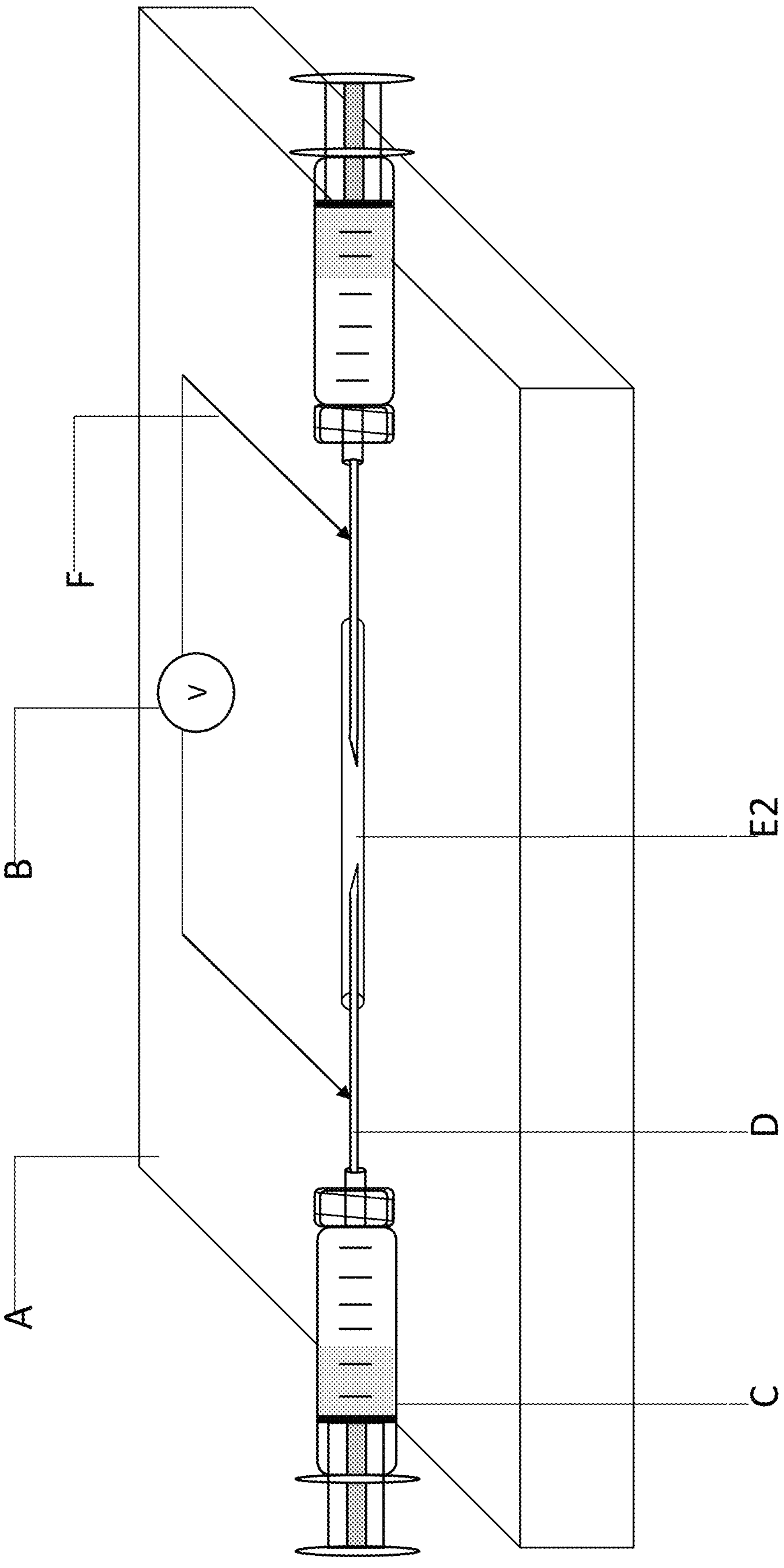
FIG. 2 illustrates an integrated device platform with a tubular test cell that seals around the elongated hollow tubular electrodes that are connected to a power supply and reagent containers.

FIG. 2 illustrates an embodiment similar to FIG. 1 but differs in test cell. The test cell as shown in E2 is a transparent cylindrical tube that seals or fits tightly with electrodes shown as D to prevent leakage of the reagent.

Figure 3:
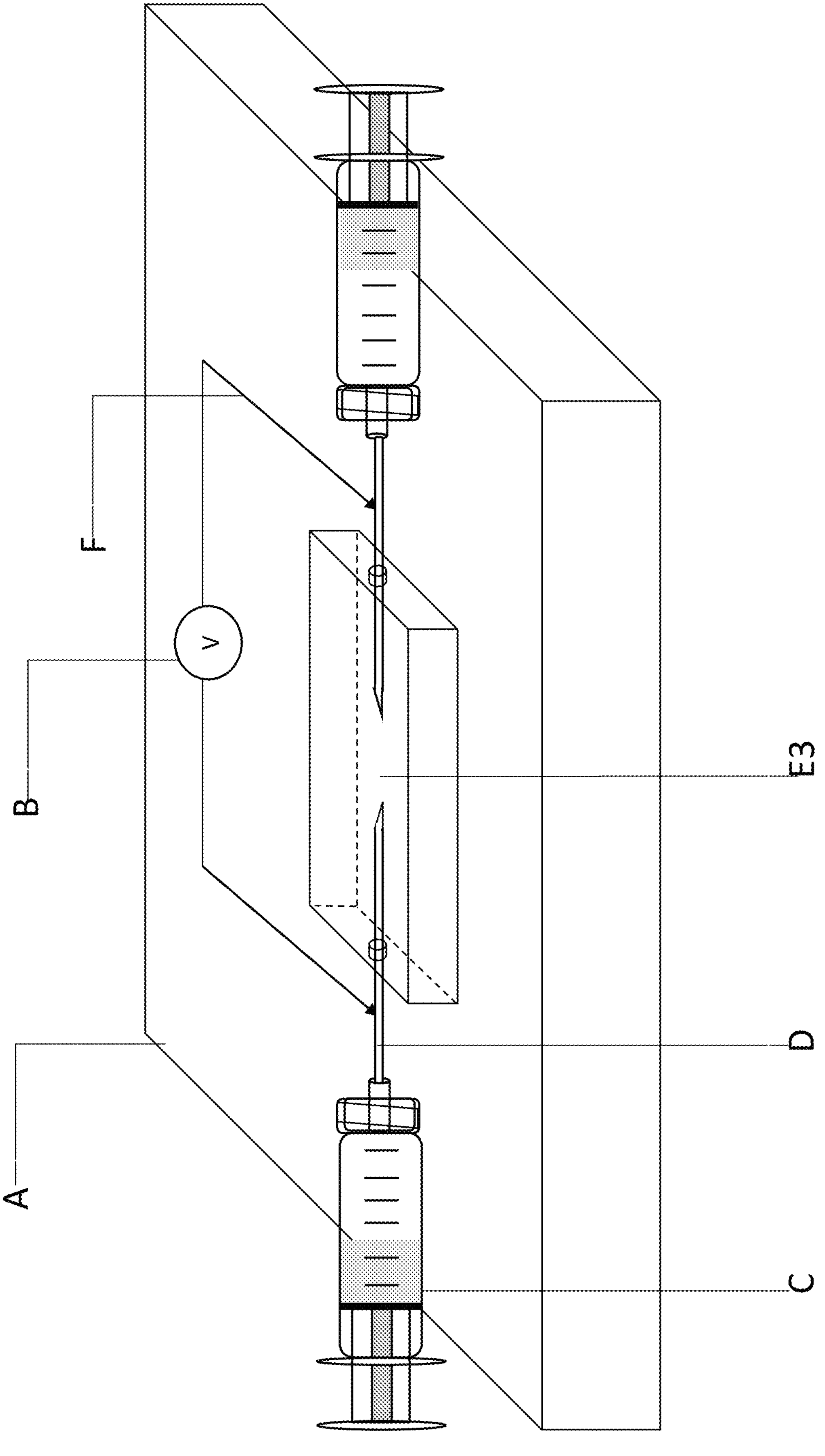
FIG. 3 illustrates an integrated device platform with a boxed test cell that seals around the elongated hollow tubular electrodes that are connected to a power supply and reagent containers.

FIG. 3 illustrates an embodiment similar to FIG. 1 but differs in test cell. The test cell as shown in E3 is a transparent boxed shaped test cell that seals or fits tightly with electrodes shown as D to prevent leakage of the reagent and holds greater volume of the reagent. The flat top of the box is optionally opened for better observation and enables easier changes of the reagent and/or electrode tips.

The device components are modular, which enable flexibly in assembly and desired applications.

The test cell (seen as E1, E2, E3) material is selected from a group consisting of transparent insulators including glass, quartz, plastic, and polymer. The ends of the test cell are preferably fitted tightly around the electrodes.

The electrode material (seen as D) is selected from a group consisting of good conductors with reactive or nonreactive properties relative to the reagent. Preferably for nonreactive conductors, materials such as stainless steel, platinum, gold, rhodium, graphite, and silver are used. Preferably for reactive conductors, materials such as zinc, copper, lead, and aluminum are used. One or both electrodes in the device are elongated hollow cylindrical tubes with variable inner and outer diameters, where the length of the electrode is also variable. The tip of the electrode is interchangeable and is selected from a group consisting of sharp point, flat, and semispherical. In addition, the tip of the electrodes is coated with one or more materials selected from a group consisting of paint, powder, sol-gel, polymer, and organic compounds. When the electrodes are inserted in the test cell, the distance between the electrodes is adjustable and measurable based on experimental requirements.

The reagent container (e.g., a simple reciprocating pump consisting of a plunger that fits tightly within a barrel (seen as C)) holds reagents in solid powder form, liquid (e.g., oil, acid, base, water, sol-gel, fat, or other solutions), and/or gas state (e.g., air, inert gases, or reactive gases). And provides accurate delivery of known quantity (i.e., unit measurement). Preferably, the container is transparent and selected from a group consisting of glass, plastic, and polymer.

The cables (seen in F) connect the electrodes with the power supply or electrical measurement equipment (seen as B) to create an electric field in the test cell.

The power supply (seen as B) uses either AC or DC that are adjustable ≤50 V AC or ≤120 V DC to minimize electrical harm. Preferably, ≤25 V AC or ≤60 V DC are used. More preferably, ≤12 V AC or ≤30 V DC are used. Even more preferably, ≤5 V AC or ≤15 V DC are used.

The reagent container (e.g., reciprocating pump with plunger as seen in C) and the test cell (seen in E1, E2, and E3) are secured to the device platform (seen in A) during testing to prevent movements of the components.

Embodiments

The following examples are given to illustrate various embodiments, which have been made of the present invention. It is to be understood that the following examples are not comprehensive or exhaustive of the many types of embodiments which can be prepared in accordance with the present invention.

In Embodiment 1, the device is utilized in a dielectric strength comparative study. Commercial stainless steel hypodermic needles (e.g., 21-gauge needle with outer diameter 0.8 mm, inner diameter 0.5 mm, and length of 38 mm) are used as electrodes with 0.25 mL of distilled water as the reagent in each of the syringes. The electrodes are positioned in a clear open hemicylindrical channel test cell opposing each other 5 mm apart. The test cell and the syringes are secured on to the device platform with clamps. Distilled water is introduced into the test cell by manually injecting the syringe until the electrode is fully submerged. Electrode cables are attached to the electrode outside of the test cell and connected to a variable DC power source. The power source is slowly ramped up until there is a sharp increase in current. The associated voltage that generated this observation is indicative of the breakdown voltage, where the minimally applied electric field or voltage results in breakdown of the reagent that yields conductivity. The dielectric strength is directly related to the breakdown voltage times the electrode distance. Comparatively, the reagent is replaced with tap water in the same setup. The resulting measurement has a smaller voltage applied to achieve breakdown voltage because impurities in tap water enhance conductivity. By utilizing the device as described, the reagents are investigated in a comparative manner that provides information on relative material behaviors.

In Embodiment 2, the device is utilized in a corrosion comparative study. Commercial stainless steel hypodermic needles (e.g., 21-gauge needle with outer diameter 0.8 mm, inner diameter 0.5 mm, and length of 38 mm) are used as electrodes with 0.25 mL of salt water as the reagent in each of the syringes. The electrodes are fitted tightly in a clear tubular test cell opposing each other 5 mm apart. The test cell and the syringes are secured on to the device platform with clamps. Salt water is introduced into the test cell by manually injecting the syringe until the entire test cell is filled. Electrode cables are attached to the electrode outside of the test cell and connected to a variable DC power source. The power source is set to 5 V DC and time duration to induce a color change is monitored. The color change is indicative of corrosion of the electrode and will increase the conductivity of the reagent. Comparatively, the electrodes are covered with a paint coating in the same setup. The resulting measurement has a time duration to induce corrosion that is four to five time longer than with no paint coating because the paint provides protection from corrosion. By utilizing the device as described, electrochemical reactions are observed and provide information on material enhancements by assessing various electrode coating types.

In Embodiment 3, similar to Embodiment 2, the distance between electrodes is adjusted towards each until breakdown voltage occurs. The resulting measurement has a shorter distance for breakdown voltage for the electrodes protected with paint because the paint provides protection from corrosion that induces conductivity. By utilizing the device as described, electrochemical reactions are observed and provides information on materials properties by quickly assessing breakdown voltage via electrode distance adjustments.

While these embodiments, materials, parameters, etc. have been set forth to exemplify and explain the principles of the invention, such are not intended to be limiting. Modifications and changes may become apparent to those skilled in the art, and it is intended that the invention be limited only by the scope of the appended claims.

The invention claimed is:

1. A system for testing electrical and/or electrochemical properties comprises:

a) a pair of adjustable electrodes opposing each other wherein at least one of the electrodes is an elongated hollow cylindrical electrode;

b) each electrode is connected to a physically separate reagent container outside of an open test cell, wherein the top of the open test cell is exposed to environment;

c) the open test cell holds reagent from the reagent containers and the opposing electrodes;

d) a test platform that secures the reagent containers and the open test cell;

e) a power source and/or an electrical measurement equipment; and f) connector cables that link both electrodes and the power source and/or the electrical measurement equipment to form an electrical field in the open test cell; therefore, the system enables experimental tests under the electrical field through the formation of a test circuit as the reagent in the open test cell is introduced through one or both of the electrodes connected to their corresponding reagent container, wherein a tip of at least one of the electrodes is replaceable/interchangeable, wherein the replaceable/interchangeable tip is inserted into one end of its corresponding hollow electrode, and wherein the tip has a semispherical shape.

2. The system according to claim 1, wherein a volume of the open test cell is 10 cubic centimeters (cc) or less.

3. The system according to claim 2, wherein the volume of the open test cell is 1 cubic centimeter (cc) or less.

4. The system according to claim 2, wherein the volume of the open test cell is 0.1 cubic centimeters (cc) or less.

5. The system according to claim 2, wherein the material of the open test cell is transparent and selected from a group consisting of glass, quartz, plastic, and polymer.

6. The system according to claim 1, with a fixed voltage between the opposing electrodes, distance between the electrodes is adjusted towards each other until a breakdown voltage occurs.

7. The system according to claim 6, wherein one or both of the electrodes are replaceable and interchangeable.

8. The system according to claim 1, wherein the distance between the two electrodes is adjustable in the open test cell.

9. The system according to claim 8, wherein the material of one or both of the electrodes is selected from a group consisting of metal, metal alloys, semiconductors, graphite and conductive polymers.

10. The system according to claim 1, wherein the replaceable tip is coated with one or more materials selected from a group consisting of paint, sol-gel, and powder.

11. The system according to claim 1, wherein the reagent in the open test cell is a liquid.

12. The system according to claim 11, wherein the liquid of the reagent in the open test cell is selected from a group of a material consisting of oil, water, acid, base, and salt solution.

13. The system according to claim 1, wherein each of the reagent containers is made from material selected from a group consisting of glass, plastic, and polymer.

14. The system according to claim 13, wherein each of the reagent containers is a simple reciprocating pump consisting of a plunger that fits tightly within a barrel.

15. The system according to claim 14, wherein each of the reagent containers is a syringe.

16. The system according to claim 1, further comprising adjustable clamps/holders that secure the reagent containers and the open test cell on the test platform.

17. The system according to claim 1, wherein the power source provides 50 V AC or less or 120 V DC or less to create the electric field in the open test cell, additional measurement equipment is optionally added to the test circuit and observational equipment is optionally added on the test platform.

18. The system according to claim 1, wherein the electrical measurement equipment measures signals from the open test cell.

* * * * *